(12) United States Patent
Auer et al.

(10) Patent No.: US 11,490,991 B2
(45) Date of Patent: Nov. 8, 2022

(54) MEDICAL ULTRASONIC TREATMENT DEVICE

(71) Applicant: W&H Dentalwerk Bürmoos GmbH, Bürmoos (AT)

(72) Inventors: Theresa Auer, Oberndorf (AT); Andreas Brandstaetter, St. Pantaleon (AT); Rainer Schroeck, Lamprechtshausen (AT); Wilhelm Brugger, Wals-Siezenheim (AT)

(73) Assignee: W&H Dentalwerk Bürmoos GmbH, Bürmoos (AT)

( * ) Notice: Subject to any disclaimer, the term of this patent is extended or adjusted under 35 U.S.C. 154(b) by 1274 days.

(21) Appl. No.: 15/922,362

(22) Filed: Mar. 15, 2018

(65) Prior Publication Data
US 2018/0280113 A1  Oct. 4, 2018

(30) Foreign Application Priority Data
Mar. 31, 2017 (EP) .................... 17164040

(51) Int. Cl.
| | | |
|---|---|---|
| *H01L 41/04* | (2006.01) | |
| *A61C 1/07* | (2006.01) | |
| *A61C 17/20* | (2006.01) | |
| *B06B 1/02* | (2006.01) | |

(Continued)

(52) U.S. Cl.
CPC ............... *A61C 1/07* (2013.01); *A61C 17/20* (2013.01); *B06B 1/0207* (2013.01); *B06B 1/0611* (2013.01); *B06B 3/00* (2013.01); *H05K 1/028* (2013.01); *H05K 1/11* (2013.01); *H05K 1/181* (2013.01); *H05K 3/32* (2013.01);

(Continued)

(58) Field of Classification Search
CPC ......... A61C 1/07; A61C 17/20; B06B 1/0207; B06B 1/0611; B06B 3/00; B06B 2201/76; H05K 1/11; H05K 1/181; H05K 3/32; H05K 2201/10083; H05K 2201/10189;

(Continued)

(56) References Cited

U.S. PATENT DOCUMENTS 4,989,588 A * 2/1991 Kubota ............ A61B 17/22012
                                                   601/4
8,314,605 B2   11/2012 Pruckner et al.
(Continued)

FOREIGN PATENT DOCUMENTS

| EP | 2057960 | 5/2009 |
|----|---------|--------|
| JP | 5335310 | 11/2013 |

(Continued)

OTHER PUBLICATIONS

Search Report for EP17164040, dated Aug. 30, 2017.

*Primary Examiner* — J. San Martin
(74) *Attorney, Agent, or Firm* — Klarquist Sparkman, LLP (57) ABSTRACT

A medical, particularly a dental or dental surgical, ultrasonic treatment device for generating ultrasonic vibrations and transmitting the ultrasonic vibration to a tool, which can be connected to the ultrasonic treatment device, the medical ultrasonic treatment device having: an ultrasonic vibration generator with a plurality of piezoelectric elements to which an electric voltage can be applied, and a circuit board to supply the plurality of piezoelectric elements with the electric voltage. Furthermore, a method for manufacturing a corresponding medical ultrasonic treatment device is described.

19 Claims, 3 Drawing Sheets

(51) Int. Cl.
　　　*B06B 1/06*　　　(2006.01)
　　　*B06B 3/00*　　　(2006.01)
　　　*H05K 1/02*　　　(2006.01)
　　　*H05K 1/11*　　　(2006.01)
　　　*H05K 1/18*　　　(2006.01)
　　　*H05K 3/32*　　　(2006.01)
　　　*H01L 41/047*　　(2006.01)
　　　*H01L 41/083*　　(2006.01)

(52) U.S. Cl.
　　　CPC ....... *B06B 2201/76* (2013.01); *H01L 41/0471* (2013.01); *H01L 41/0472* (2013.01); *H01L 41/0475* (2013.01); *H01L 41/0835* (2013.01); *H05K 2201/10083* (2013.01); *H05K 2201/10189* (2013.01); *H05K 2201/10515* (2013.01)

(58) Field of Classification Search
　　　CPC ...... H05K 2201/10515; H01L 41/0471; H01L 41/0472; H01L 41/0835
　　　See application file for complete search history.

(56) References Cited

U.S. PATENT DOCUMENTS

| | | | |
|---|---|---|---|
| 2008/0252172 A1* | 10/2008 | Yetter | B06B 1/0629 29/25.35 |
| 2010/0109644 A1 | 5/2010 | Pruckner et al. | |
| 2012/0172721 A1* | 7/2012 | Curra | A61B 8/4494 600/447 |
| 2014/0066818 A1* | 3/2014 | Akagane | A61B 17/320068 601/2 |
| 2015/0119761 A1* | 4/2015 | Yamada | A61B 18/1445 601/2 |

FOREIGN PATENT DOCUMENTS

| | | | |
|---|---|---|---|
| WO | WO2013/122390 | 8/2013 | |
| WO | WO-2015072318 A1 * | 5/2015 | ..... A61B 17/320092 |

\* cited by examiner

MEDICAL ULTRASONIC TREATMENT DEVICE

CROSS REFERENCE TO RELATED APPLICATION

The present application claims priority from pending European Patent Application No. 17164040.2, filed Mar. 31, 2017, which is incorporated herein by reference.

FIELD

The present application relates to a medical, particularly a dental or dental surgical, ultrasonic treatment device for generating ultrasonic vibrations and for transmitting the ultrasonic vibrations to a tool, which is or can be connected to the ultrasonic treatment device. The ultrasonic treatment device preferably includes a dental tartar removing device, frequently called a scaler.

DESCRIPTION OF PRIOR ART

Such a medical, particularly dental or dental surgical, ultrasonic treatment device is disclosed, for example, in commonly-owned U.S. Pat. No. 8,314,605. To generate the ultrasonic vibrations, this treatment device comprises an ultrasonic vibration generator with a plurality of piezoelectric elements, particularly piezoceramics, to which an electric voltage can be applied to generate the ultrasonic vibrations. By applying a voltage, in particular, an alternating voltage, the piezoelectric elements (the piezocrystals contained therein) are deformed and execute a synchronous oscillation of their thicknesses in the same direction at an ultrasonic frequency. The piezoelectric elements thus form at least part of an electromechanical converter, which converts the applied voltage into mechanical vibrations.

To apply an electric voltage to the piezoelectric elements, metallic wires are provided, which connect the piezoelectric elements to an electric power source. Between the individual piezoelectric elements, there are disposed ring-shaped or disk-shaped metallic electrodes, which are connected to the metallic wires by soldering in order to be able to supply the piezoelectric elements with electric voltage.

The manufacture of such an ultrasonic vibration generator, in particular, the soldering of the metallic wires to the electrodes, is difficult and time-consuming, not least because of the small dimensions of the components, and there is always the risk of an incorrect assembly.

SUMMARY

Based on the foregoing, it would be advantageous to provide a medical, particularly a dental or dental surgical, ultrasonic treatment device, the manufacture or assembly of which can be achieved more easily, faster, and more reliably.

These and other objectives are accomplished by implementations of the medical, particularly dental or dental surgical, ultrasonic treatment device and methods of manufacturing such devices described below.

According to one implementation, a medical, particularly dental or dental surgical, ultrasonic treatment device for generating ultrasonic vibrations and transmitting the ultrasonic vibrations to a tool, which is or can be connected to the ultrasonic treatment device, comprises an ultrasonic vibration generator having a plurality of piezoelectric elements, to which an electric voltage can be applied to generate ultrasonic vibrations, wherein a circuit board is provided to supply the plurality of piezoelectric elements with electric voltage. In particular, the circuit board is implemented as a single circuit board.

Providing a circuit board significantly simplifies manufacture and assembly of the medical ultrasonic treatment device, in particular of the ultrasonic vibration generator or electromechanical converter. In particular, soldering and/or comparable activities for connecting the piezoelectric elements to the electrical power source are omitted during manufacture. This makes manufacturing or assembling the ultrasonic vibration generator significantly simpler and faster, and it can be carried out with markedly less scrap.

The circuit board comprises, in particular, a carrier layer of an electrically insulating material and electrically conductive metallic conducting paths adhering thereto. The electrically insulating material of the carrier layer preferably comprises plastic, in particular, of fiber-reinforced plastic. The conducting paths preferably comprise copper.

Particularly preferably, the circuit board is formed as a flexible circuit board, which comprises at least flexible sections or is completely flexible, as also are, in particular, any projections or lugs protruding from the body of the circuit board. Thus, according to one embodiment, a flexible circuit board may have flexible circuit board sections and rigid circuit board sections. The rigid circuit board sections are formed, for example, as contact sections described in detail below, for the application of the electric voltage to at least one of the multiple piezoelectric elements. Flexible circuit boards are defined particularly in that at least one section of the circuit board or the entire circuit board can be deformed at least once (in particular, during installation of the flexible circuit board into the ultrasonic treatment device) or preferably a plurality of times, and that this deformation (including functionality after the deformation) is retained at least in the installed state. The deformation, in particular, includes bending or a bending step.

The electric voltage for supplying the plurality of piezoelectric elements comprises preferably an alternating voltage. The electrical power source for supplying the plurality of piezoelectric elements and/or the ultrasonic treatment device with electrical energy preferably is connected to the ultrasonic treatment device by a supply cable with electric leads or wires. The electrical leads or wires of the supply cable preferably are connected to the circuit board, especially to the electric leads or conducting paths thereof, wherein for this connection a coupling device is particularly preferably provided at a coupling end of the ultrasonic treatment device.

Preferably, the plurality of piezoelectric elements are produced from a ceramic material. The plurality of piezoelectric elements preferably are formed as flat cylindrical plates, each particularly having one lateral surface and two end faces mutually opposite to one another. At least some or all of the plurality of piezoelectric elements preferably have a respective penetration or breakthrough (opening), in particular in the center, so that the piezoelectric elements, particularly preferably, are ring-shaped. The plurality of piezoelectric elements, particularly preferably, are arranged along an axis, so that, in particular, they form a stack. The penetrations of the plurality of piezoelectric elements are, in particular, aligned along the axis or longitudinal axis of the stack. The penetrations of the plurality of piezoelectric elements preferably are round and/or circular.

The stack preferably has a passage comprising the penetrations of the plurality of piezoelectric elements arranged in alignment with one another. The passage extends, in particular, along the longitudinal axis of the stack. The passage, in particular, is provided for the passage of a treatment fluid. The passage, in particular, is provided for holding a fluid line for the passage of a treatment fluid. The fluid line preferably passes through the stack or the passage and/or extends through the stack or the passage.

The circuit board is constructed either as a single-sided circuit board, so that electrically conducting paths are provided only one side of the circuit board or of the carrier layer of the circuit board or, preferably, as a through-plated double-sided circuit board with conducting paths on both sides of the carrier layer. Preferably an electrically insulating layer, such as a lacquer, is provided on or over at least one conducting path.

The circuit board preferably comprises a plurality of contact sections, each contact section being provided for applying the electric voltage to at least one of the plurality of piezoelectric elements. Each of the contact sections is disposed and/or constructed in such a way, that it can be applied to at least one of the plurality of piezoelectric elements to establish an electrical contact. Preferably, at least one of the contact sections is disposed on at least one end face of a piezoelectric element. Preferably, at least one of the contact sections can be inserted between two neighboring piezoelectrical elements, especially between the two end surfaces thereof and, in particular, can be provided thereon to apply electrical contact.

The contact sections preferably are planar. The contact sections can in particular be formed by flexible or rigid circuit boards or circuit board sections. The contact sections preferably correspond to the shape of the piezoelectric elements and/or, in particular, are circular or ring-shaped. Each contact section preferably is provided with at least one surface contact, where an electrically conducting metal layer or conducting path of the circuit board contacts (directly or indirectly) one of the plurality of piezoelectric elements. The surface contacts thus comprise, in particular, sections of the circuit board or contact sections, which have no electrically insulating layer (as described above), so that the electrically conducting metal layer or conducting path (which is applied to the carrier layer) is exposed. The surface contacts preferably are formed to correspond to the contact sections. The surface contacts preferably are circular or ring-shaped.

The contact sections are, for example, formed by flat lugs projecting from the circuit board. However, the contact sections are preferably formed as an integral (not projecting) part of the circuit board, in particular, of a flexible circuit board, so that the circuit board is, in particular, formed as an elongated, strip-like element, in which the contact sections are incorporated.

Preferably, at least one of the plurality of contact sections, in particular a contact section that is inserted between two neighboring piezoelectric elements, comprises a surface contact on each of two mutually opposite sides or faces. Preferably, a first side of the two opposing sides forms a first electrical pole, for example, a plus or a minus pole and the second of the two opposing sides forms the alternative electrical pole, for example, a minus or a plus pole. This permits a contact section to supply electrical power in an advantageous manner to a plurality of, in particular two neighboring, piezoelectric elements, between which it is inserted.

Preferably the plurality of contact sections, in particular, their respective, surface contacts, are spaced apart from one another. Preferably the plurality of contact sections, in particular the surface contacts of the contact sections, are substantially parallel with one another and/or arranged in parallel next to one another. Preferably, one of the plurality of piezoelectric elements is arranged between two neighboring contact sections arranged substantially in parallel with one another.

Preferably two of the plurality of contact sections are connected to one another by a, in particular, strip-shaped and/or narrow connecting section of the circuit board. Preferably, the connecting section is implemented as a flexible circuit board section. The width of the connecting sections is, preferably, less than the width of the contact sections. The axial length of a connecting section, which connects two contact sections, is preferably less than the diameter of the contact sections connected by this connecting section. Preferably the axial length (relative to the longitudinal axis of the stack of piezoelectric elements) of a connecting section corresponds substantially to the axial height or thickness of a piezoelectric element, in particular of that piezoelectric element, which is arranged between the two contact sections connected by the connecting section. Preferably at least one connecting section is arranged substantially parallel to a peripheral outer side or outer sheath of a piezoelectric element, in particular, that piezoelectric element arranged between the two contact sections connected by the connecting section. The connecting sections are preferably spaced apart from the piezoelectric elements, in particular, by an air gap.

If the circuit board is implemented as a double-sided circuit board with conducting paths on both sides of the carrier layer, then preferably there are provided through contacts on at least one connecting section, in particular, on a plurality of connecting sections, at which at least one conducting path switches from one side of the circuit board to the other, opposite side of the circuit board. In this manner, it is possible for opposing electrical poles to be arranged on one contact section, that is, on opposing sides of a contact section, which poles are, in particular, formed by the surface contacts, for the purpose of supplying the piezoelectric elements with power.

The piezoelectric elements and/or the contact sections are preferably arranged in layers. In particular, the piezoelectric elements and/or contact sections are arranged in alternating layers, so that alternatingly a piezoelectric element is followed by a contact section and a contact section is followed by a piezoelectric element.

Particularly preferably, the plurality of piezoelectric elements are arranged in a stack, wherein between two neighboring piezoelectric elements of the stack, one of the plurality of contact sections of the circuit board is arranged and/or between two neighboring contact sections a piezoelectric element of the stack is arranged. Particularly preferably, the plurality of piezoelectric elements and the plurality of contact sections form a stack together. Particularly preferably, one of the plurality of contact sections is located at the start and one at the end of this stack. Particularly preferably, the contact sections arranged at the start and end of the stack, each have only one surface contact, while the other side of the contact section is electrically insulated, in particular having an electrically insulating layer. Particularly preferably, the electrically insulated side of the contact section is separated from the piezoelectric elements, while the side with the surface contact is assigned to a piezoelectric element, in particular contacting it.

Preferably, at least one of the plurality of contact sections of the stack, which is inserted between two neighboring piezoelectric elements, comprises a surface contact on each of its two opposite sides or faces. Preferably, a first side of the two opposite sides or of the surface contacts provided thereon forms a first electrical pole, for example, a plus or a minus pole, and the second of the two opposing sides or of the surface contacts provided thereon forms the alternative electrical pole, for example, a minus or a plus pole.

The spacing between two contact sections preferably corresponds roughly to the axial height or thickness of a piezoelectric element, in particular to the height of the lateral surface of a flat cylindrically shaped piezoelectric element, and/or the axial length of a connecting section.

The connecting sections, in particular, the narrow and/or strip-shaped connecting sections, of the circuit board are arranged outside the stack. The connecting sections are preferably spaced to the side or around the circumference of the stack. Preferably the connecting sections following one another are always arranged on opposite sides of the stack, relative to a longitudinal axis of the stack.

A circuit board implemented as a flexible circuit board, is preferably formed as a flat strip before being installed in the ultrasonic vibration generator or before the manufacture of the stack comprising the piezoelectric elements, which flat strip in particular comprises the plurality of contact sections and the, in particular, narrow and/or strip-shaped connecting sections, as well as an linking section to be described below.

The flexible circuit board is preferably bent or folded after installation in the ultrasonic vibration generator or after the manufacture of the stack comprising the piezoelectric elements, wherein it is bent or folded at least or exclusively in the area of the plurality of contact sections and the, in particular narrow and/or strip-shaped, connecting sections. Particularly preferably, the flexible circuit board is formed into an S shape after installation, in particular, the contact sections arranged at and/or between the piezoelectric elements and the connecting sections located outside the stack, form an S shape.

The arrangement of piezoelectric elements and contact sections into a stack as described in the paragraphs above, the arrangement of the connecting sections of the circuit board outside the stack, the bent, folded, or S-shaped form of a flexible circuit board, etc. permit, in an advantageous manner, a very simple assembly and manufacture of the ultrasonic vibration generator while simultaneously having a reliable effect and a high performance.

Preferably at least some or all of the contact sections of the circuit board have a respective penetration (opening) or breakthrough, in particular located centrally, so that the contact sections, particularly preferably, are ring-shaped. The penetrations in the contact sections advantageously correspond to the penetrations or breakthroughs in the piezoelectric elements described above, in particular in their size, their diameter, their shape, and/or their position. The penetrations of the contact sections are preferably round and/or circular in shape. The penetrations of the contact sections are, in particular, arranged in alignment along the axis/longitudinal axis of the stack. The penetrations of the contact sections are, in particular, arranged in alignment with the penetrations in the piezoelectric elements.

The penetration or breakthrough of the stack already described above in particular comprises the penetrations of the plurality of piezoelectric elements and of the plurality of contact sections of the circuit board, which, in particular, are arranged in alignment along the longitudinal axis of the stack and in an alternating fashion. The penetration is, in particular, provided for the passage of a treatment fluid, for example, by holding a fluid line that can be connected to a fluid source.

The circuit board, preferably, comprises a linking section, particularly in strip-like or elongated form, for attachment to an electric power source. The linking section extends, in particular, in the direction of and/or up to a coupling device of the ultrasonic treatment device to connect to a control, regulating, and/or supply device. The linking section preferably extends from the ultrasonic vibration generator, in particular, between and/or to the coupling device. The linking section is, preferably, connected to one of the contact sections of the circuit board, in particular, directly. The width of the linking section is preferably less than the width or the outer diameter of the contact sections. The linking section preferably comprises two opposite sides, both equipped with at least one conducting path each.

The linking section preferably comprises a free end or an end facing an electrical power source or facing the coupling device, on which two electrical contacts are provided which are electrically connected to the circuit board, in particular to its conducting paths, for supplying the circuit board and/or the ultrasonic vibration generator with electrical energy. The two electrical contacts are, for example, implemented as pin contacts. The two electrical contacts are preferably soldered to the circuit board, in particular to its conducting paths. The conducting paths running in the circuit board, can preferably be contacted from outside through the two electrical contacts.

The linking section preferably comprises, on its end, on which the two contacts which electrically connect to the circuit board, are located, a plastic body that surrounds and/or connects together the electrical contacts and the end of the linking section of the circuit board. The plastic body is, for example, made of silicone or epoxy resin. The plastic body is preferably electrically insulating. The plastic body is preferably made by casting or injection molding.

The plastic body is preferably formed as a molded body with a defined shape. Particularly preferably, the plastic body is formed as a plug element that can be inserted into a (first) plug connector of the medical ultrasonic treatment device to fasten the circuit board and the electrical contacts. The plug element is preferably bent, for example saddle-shaped. The design of the plastic body as a plug element additionally simplifies the assembly of the ultrasonic treatment device.

The (first) plug connector to hold the plastic body is preferably provided on or adjacent to the coupling device or a coupling end for connection to a control, regulating, and/or supply device of the ultrasonic treatment device. The plug connector is preferably provided at an end of a sleeve or sleeve-like element of the ultrasonic treatment device.

The plurality of contact sections, after installation into the ultrasonic vibration generator or after the manufacture of the stack comprising the piezoelectric elements, are preferably arranged at an angle relative to the linking section and/or relative to the connecting sections.

The ultrasonic treatment device preferably comprises an additional (or second or separate) circuit board for supply of electrical energy to a radiation source emitting electromagnetic radiation provided on the ultrasonic treatment device. The first circuit board provided for supplying the plurality of piezoelectric elements with electrical voltage and the second circuit board are preferably designed as independent, separate circuit boards. In particular the first and the second circuit boards are arranged at a distance from one another in the ultrasonic treatment device. The second circuit board preferably extends over or is substantially parallel with the ultrasonic vibration generator. The second circuit board is preferably designed as a rigid or (partly or fully) flexible circuit board.

The second circuit board preferably comprises a free end or an end facing an electrical power source or facing the coupling device, on which two electrical contacts electrically connected to the circuit board, in particular to its conducting traces, for supplying the second circuit board and/or of radiation source with electrical energy. The two electrical contacts are, for example, implemented as pin contacts. The two electrical contacts are preferably soldered to the second circuit board, in particular to its conducting paths.

The second circuit board preferably comprises, on an end on which the two contacts electrically connected to the circuit board are located, a second plastic body that surrounds and/or connects together the electrical contacts and the end of the second circuit board. The second plastic body is, for example, made of silicone or epoxy resin. The second plastic body is preferably electrically insulating. The second plastic body is preferably made by casting or injection molding.

The second plastic body is preferably formed as a molded body with a defined shape. Particularly preferably, the second plastic body is formed as a plug element, which can be inserted into a (second) plug connector of the medical ultrasonic treatment device to fasten the second circuit board and the electrical contacts. The plug element is preferably bent, for example saddle-shaped. The design of the second plastic body as a plug element also simplifies the assembly of the ultrasonic treatment device.

The first plug connector and the second plug connector are preferably designed as separate plug connectors located at a distance from one another. The second plug connector to hold the plastic body is preferably provided on or adjacent to the coupling device or a coupling end for connection to a control, regulation, and/or supply device of the ultrasonic treatment device. The second plug connector is preferably provided at an end of a sleeve or sleeve-like element of the ultrasonic treatment device. Both plug connectors are preferably provided on a single or shared sleeve-like element.

Alternatively, it is conceivable for a single, in particular, a flexible, circuit board to be provided for supplying power to the plurality of piezoelectric elements as well as for supplying power to the radiation source emitting electromagnetic radiation provided on the ultrasonic treatment device. This single circuit board preferably comprises separate conducting paths for the supplying electrical power to the plurality of piezoelectric elements and to the radiation source.

The ultrasonic treatment device preferably comprises a tool detection device to detect a tool that can be connected to the ultrasonic treatment device, wherein the tool detection device transmits electrical signals for the detection of the tool. It is preferably conceivable for a single, in particular a flexible, circuit board to be provided for supplying the plurality of piezoelectric elements with electric power and for the transmission of the electrical signals of the tool detection device. It is particularly preferably conceivable for a single circuit board to be provided for the supply of power to the plurality of piezoelectric elements, the supply of power to a radiation source emitting electromagnetic radiation provided on the ultrasonic treatment device and for the transmission of the electrical signals of the tool detection device. This single circuit board preferably comprises separate conducting traces for the electrical supply of power to the plurality of piezoelectric elements and to the radiation source and for the transmission of the electrical signals of the tool detection device.

The radiation source emitting electromagnetic radiation is preferably detachable from the single or second, separate circuit board, so that the radiation source is interchangeable. To this end, there is preferably a detachable electrical connection provided between the radiation source and the single or second, separate circuit board, for example, an electrical plug connection or spring contact.

A method for the manufacture of a medical ultrasonic treatment device for the generation of ultrasonic vibrations and for the transmission of ultrasonic vibrations to a tool, which is or can be connected to the ultrasonic treatment device, in particular, for the manufacture of an ultrasonic treatment device described above, comprises that an ultrasonic vibration generator with a plurality of piezoelectric elements, to which an electric voltage can be applied for the generation of ultrasonic vibrations, is provided and that the plurality of piezoelectric elements are connected to a (single), in particular a flexible, circuit board through which the piezoelectric elements can be supplied with electric power.

The circuit board preferably comprises a plurality of, preferably circular, contact sections, wherein on each contact section at least one surface contact with an electrically conducting metallic layer is provided, wherein in the manufacturing method the contact sections are arranged substantially parallel to one another, in particular by deformation, bending or folding of a flexible circuit board and between two neighboring contact sections one of the plurality of piezoelectric elements is contactingly inserted, so that the piezoelectric element inserted between the two neighboring contact sections (directly) makes contact with one surface contact of each of the two neighboring contact sections.

In the manufacturing method, the plurality of piezoelectric elements are preferably arranged in a stack in such a way that one of the plurality of contact sections of the circuit board is located between two neighboring piezoelectric elements of the stack.

In the manufacturing method, the plurality of piezoelectric elements and the plurality of contact sections, which are connected to one another by, preferably narrow and/or strip-like, connecting sections, are preferably arranged in the stack in such a way that the connecting sections are located outside the stack and/or at a distance from the plurality of piezoelectric elements and/or with connecting sections following one another are each located on alternating sides of the stack, relative to a longitudinal axis of the stack.

Penetrations or breakthroughs are preferably provided in the plurality of piezoelectric elements and in the plurality of contact sections, wherein the plurality of piezoelectric elements and the plurality of contact sections are arranged in the manufacturing method in such a way, in particular in the form of the stack, that the penetrations of the plurality of piezoelectric elements and of the plurality of contact sections form a through hole or passage. The through hole is in particular provided for the passage of a treatment fluid and/or to hold a fluid line. The piezoelectric elements and the contact sections are preferably arranged in the manufacturing method in such a way that the stack comprises a passage that extends along a longitudinal axis of the stack.

Penetrations or breakthroughs are preferably provided in the plurality of piezoelectric elements and in the plurality of contact sections, wherein in the manufacturing method the plurality of piezoelectric elements and the plurality of contact sections are positioned, in particular, in an alternating manner, around a fluid line or tube (for the passage of a treatment fluid) of the medical ultrasonic treatment device in such a way, that the fluid line or tube passes through the penetrations. Preferably at least a part of the fluid line or tube is held within it.

The medical, particularly dental or dental surgical, ultrasonic treating device in particular comprises a handpiece or hand grip element in which the ultrasonic vibration generator is located. The handpiece or hand grip element preferably comprises at least one of the following components:

- a tool-holding device for the preferably detachable holding of a tool. The tool comprises, for example, a scaler tip, a saw blade, or a dental surgical tool for the abrasive removal of bone material, in particular of the jawbone. The tool-holding device, in particular, comprises at least a form-fitting holding or connecting section, for example, a thread, in particular, a threaded pin or an interior thread, a helical groove, a conically tapering surface, or at least one shaped element, for example a spherical shaped element.
- a radiation source emitting electromagnetic radiation for the emission of electromagnetic radiation in the direction of the treatment site and/or of a tool connected to the handpiece or hand grip element. The radiation source preferably comprises at least an optical semiconductor element, in particular a light-emitting diode. The radiation source is preferably part of a lighting device, which, for example, furthermore comprises at least one optical guide to guide the electromagnetic radiation, one or more elements for electrical power supply, and/or a control device to control the release of the electromagnetic radiation. The radiation source is preferably designed to emit visible light and/or radiation for the detection of caries, plaque, biofilms, or similar abnormalities, for example, with a wavelength in the range from about 390 nm-420 nm. The control device is, in particular, provided in order to effect the alternating release of visible light and radiation for the detection of caries, plaque and/or biofilms. The radiation source is preferably arranged around the tool-holding device in a ring-shaped manner. The radiation source can in particular be supplied with electrical energy through the second circuit board as already described above.
- one or more fluid lines to convey a fluid, in particular a liquid and/or a gas to cool and/or rinse the treatment site. The fluid line extends in particular from a connecting or coupling end in the direction of or up to the tool end of the handpiece or hand grip element. The at least one fluid line preferably extends through the ultrasonic vibration generator as already described above. The at least one fluid line can preferably be connected to the tool that can be connected to the tool-holding device, so that the fluid carried through the at least one fluid line can be dispensed into a channel of the tool.
- a coupling device on a coupling end of the handpiece or hand grip element for connection to a controlling, regulating, and/or supplying device. The coupling device preferably comprises an electrical connection, for example, two or more electrical contacts, for connection to an electrical power source. The coupling device is thus, in particular, provided to supply electrical energy to the ultrasonic vibration generator and, if applicable, to other electrical consumers, for example, a radiation source emitting electromagnetic radiation. The coupling device thus connects, in particular, the circuit board(s) to the electrical power source. The coupling device preferably comprises a fluid connection to connect to a fluid source, in particular to a liquid source. The fluid connection is, in particular, formed as a part of the at least one fluid line described above or is connected to it.

These and other embodiments will be described below with reference to the following drawings.

DETAILED DESCRIPTION

Figure 1:
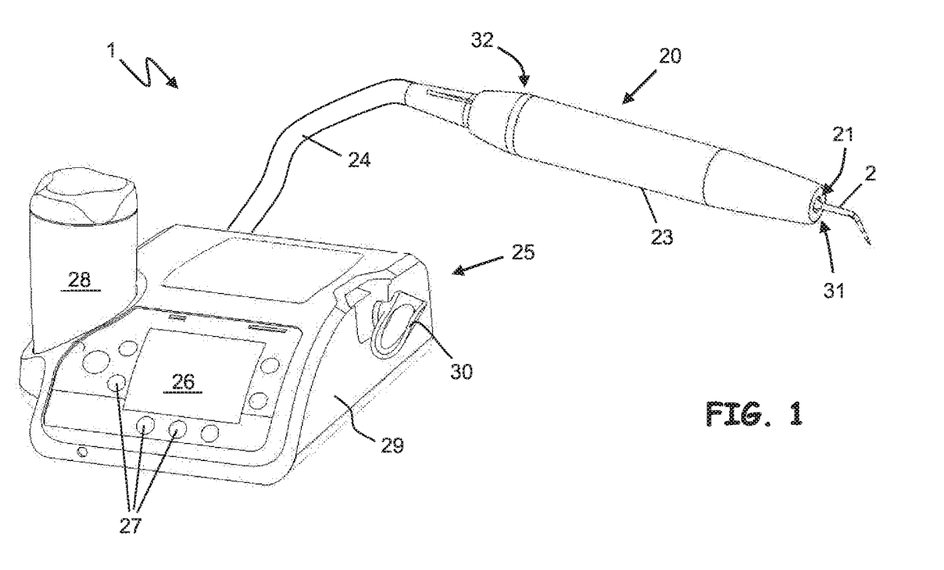
FIG. 1 shows a medical, particularly a dental ultrasonic treatment device for the generation of ultrasonic vibrations and for the transmission of the ultrasonic vibrations to a tool that is or can be connected to the ultrasonic treatment device.

FIG. 1 shows a medical, particularly dental ultrasonic treatment device 1 for the generation of ultrasonic vibrations and for the transmission of the ultrasonic vibrations to a tool 2. The ultrasonic treatment device 1 comprises a vibration-transmitting hand grip element or handpiece 20 and a medical or dental tool 2, which is in particular operable with vibrations. The handpiece 20 comprises a hollow outer or grip sleeve 23, in which an ultrasonic vibration generator 3 with a plurality of piezoelectric elements 4 is arranged, which will be presented in detail below. The tool 2 is detachably held in a preferably form-fitting tool-holding device 21. An oscillating axle 22 (see for example FIG. 4) connects the tool-holding device 21 to the ultrasonic vibration generator 3, so that tool 2 can be operated by ultrasound.

A supply hose 24 serves to connect the handpiece 20 to a control and/or supply device 25. During operation, the handpiece 20 and the tool 2 can be supplied through lines and/or wires in the supply hose 24 with working media, in particular, with electric energy as well as a fluid, for example spray water to cool the tool. The supply hose 24 furthermore serves in particular to transmit electric signals and/or data between the control and/or supply device 25 and the handpiece 20.

The control and/or supply device 25 comprises a housing 29 and is, in particular, designed as a tabletop unit. On housing 29, there is, preferably, provided a support 30 for the handpiece 20. For representation and configuration of operating parameters for handpiece 20 as well as for tool 2, the control and/or supply device 25 comprises at least one display 26 as well as at least one operating element 27. A container 28, which can be connected to the control and/or supply device 25 serves as a fluid source for the fluid, for example for the spray water. In the interior of the control and/or supply device 25, there is furthermore an electric power source for the supply of the handpiece 20, in particular of ultrasonic vibration generator 3, and of radiation source 19 emitting electromagnetic radiation.

The electromagnetic radiation source 19 is part of an illuminating device 31, which, on the tool end of the handpiece 20, comprises at least one light dispensing surface for dispensing electromagnetic radiation onto or in the direction of the treatment surface.

Figure 4:
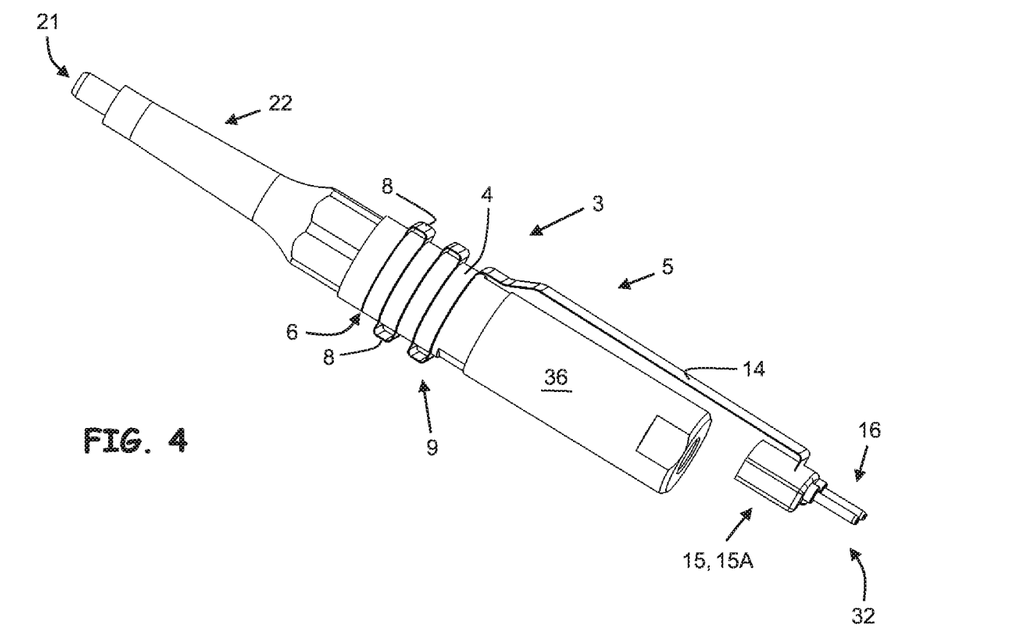
FIG. 4 shows an ultrasonic vibration assembly of an ultrasonic treatment device with an ultrasonic vibration generator comprising a circuit board and an oscillating axle.

FIG. 4 shows an ultrasonic vibration assembly located in the grip sleeve 23 of handpiece 20. The ultrasonic vibration assembly comprises an ultrasonic vibration generator 3 with a plurality of, preferably three to ten, piezoelectric elements 4, to which an electric voltage can be applied for the generation of ultrasonic vibrations, and an oscillating axle 22 to transmit the vibrations generated by the ultrasonic vibration generator 3 to the tool-holding device 21. The oscillating axle 22 is, in particular, designed as an elongated hollow axle extending along a longitudinal axis 10 (see FIG. 5), whose first end is in contact with the ultrasonic vibration generator 3 and on whose second end, opposite to the first end, there is provided at least a part of the tool-holding device 21.

To supply the plurality of piezoelectric elements 4 of ultrasonic vibration generator 3 with electrical energy, there is provided a circuit board 5, in particular, a flexible circuit board 5. The circuit board 5 extends from a coupling device or a coupling end 32 for connection to the control and/or supply device 25 in the direction of the ultrasonic vibration generator 3. Preferably at least a part of circuit board 5, in particular the linking section 14, is arranged substantially in parallel with the longitudinal axis 10 or with a sleeve 36 of the handpiece 20. Particularly preferably, at least a part of circuit board 5, in particular the linking section 14, is arranged between the grip sleeve 23 and another sleeve 36 of handpiece 20 (see FIG. 5).

Figure 3:
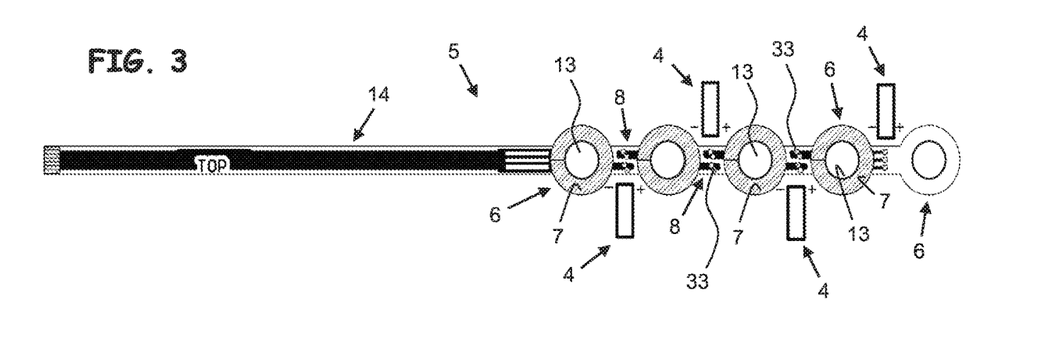
FIG. 3 shows a flexible circuit board designed as a flexible strip, before installation in an ultrasonic vibration generator of an ultrasonic treatment device.

The circuit board 5 comprises a plurality of sections which, in particular, can also easily be seen in FIG. 3, in which the circuit board 5, implemented as a flexible circuit board, has the form of a flat strip. The flexible circuit board 5, in particular, has this form before it is installed in the ultrasonic vibration generator 3. Circuit board 5 comprises a linking section 14, a plurality of circular contact sections 6 and a plurality of connecting sections 8 for the connection of two neighboring contact sections 6.

The contact sections 6 are arranged spatially serially and/or electrically parallel. The contact sections 6 have a substantially circular form with a central, circular penetration or break-through 13. On each contact section 6 there is at least one surface contact 7, at which an electrically conducting path or metallic layer, in particular a copper layer, of circuit board 5 contacts one of the plurality of piezoelectric elements 4 to apply the electrical voltage. The surface contacts 7 thus form electrodes which contact the piezoelectric elements 4.

Each of the centrally located contact sections 6 (that is, those located between two other contact sections 6)—according to FIG. 3, there are three—comprises one surface contact 7 or an electrode on each of two opposite sides, wherein preferably one surface contact 7 of each centrally located contact section 6 is a positive electrode and one a negative electrode. The two outermost or end contact sections 6 have one surface contact 7 or an electrode only on one side each, wherein according to FIG. 3 the left contact section 6 has a surface contact 7 on its upper side (labeled "Top") and the right contact section 6 has a surface contact 7 on its underside (thus not visible in FIG. 3).

Figure 2:
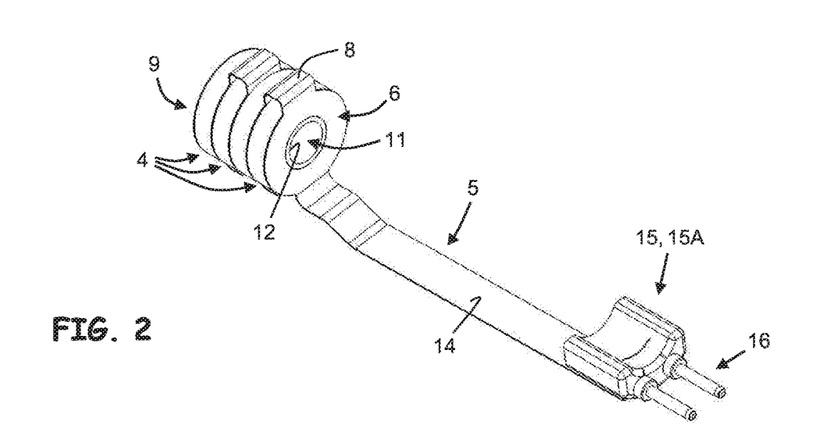
FIG. 2 shows a circuit board of an ultrasonic treatment device with a plurality of piezoelectric elements and a plug element with electrical contacts for connection to an electrical power source.

The portion of circuit board 5 comprising the contact sections 6 has an S-shaped form, as shown for example in FIG. 2, whereby a piezoelectric element 4 is located between two contact sections 6 and in particular between two surface contacts 7 of different contact sections 6, wherein one of these two surface contacts 7 in each case is a positive electrode and the other of these two surface contacts 7 is a negative electrode. This is also easily seen in FIG. 3, in which the positive and negative electrodes of the top side of circuit board 5 are indicated. On the underside of circuit board 5, not shown in FIG. 3, correspondingly the electrode opposite to that on the top side is located.

The plurality of piezoelectric elements 4 and the plurality of contact sections 6 of circuit board 6 thus form a stack 9, in which a piezoelectric element 4 and a contact section 6 are arranged in an alternating manner. There is one of the two end contact sections 6 at the start and at the end of the stack 9, whose single surface contact 7 each faces the adjacent piezoelectric element 4, while the side without a surface contact 7 or electrode is arranged facing outward, that is, facing away from the piezoelectric element 4.

In FIGS. 2, 3, and 4 it can also easily be seen that two of the plurality of contact sections 6 are connected by a narrow, strip-like, preferably flexible, connecting section 8 of circuit board 5, respectively, wherein the connecting sections 8 are located outside or to the side of the stack 9. Due to the S-shaped arrangement of the part of circuit board 5 comprising the contact sections 6, sequential connecting sections 8 are arranged on (diametrically) opposite sides of the stack 9.

As can be seen from FIG. 3, at connecting sections 8 there are provided through connections 33, at which the conducting paths pass through the circuit board 5 (its carrier layer), so that they alternately run on the upper side and underside of circuit board 5 and connect to the positive and negative electrodes of the upper side and underside of circuit board 5.

The piezoelectric elements 4 are formed as round, flat cylindrical, ceramic disks. In each piezoelectric element 4 there is a circular, centrally located penetration 12, i.e., an opening. If the piezoelectric elements 4 and the contact sections 6 are arranged along a common longitudinal axis 10, in particular, in the form of stack 9, the penetrations 12 and the penetrations 13 of contact sections 6 form a through hole 11 (see FIGS. 2 and 5).

Through hole 11 is designed for the passage of a treatment fluid, in particular a treatment liquid. To this end, preferably a fluid line 34 is provided, which extends through penetrations 12, 13 and thus through hole 11 and/or the stack 9 (see FIG. 5). Stack 9 is arranged around fluid line 34, in particular at a distance from it.

Figure 5:
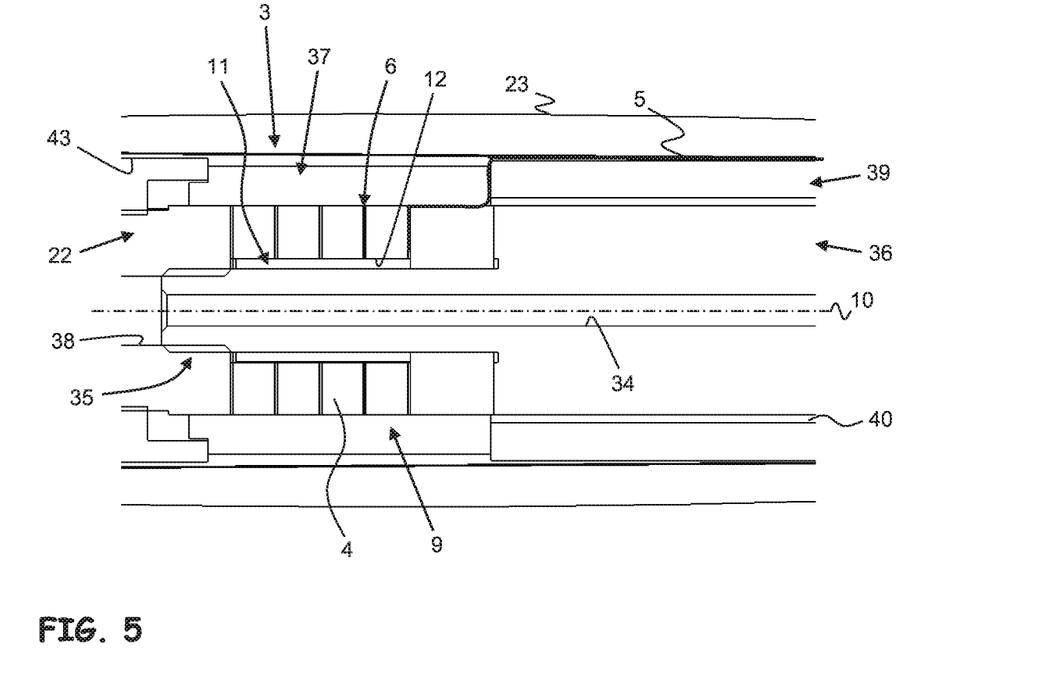
FIG. 5 shows a cross-sectional view of a section of an ultrasonic treatment device in the area of an ultrasonic vibration generator with a circuit board.

The fluid line 34 extends through additional components of the ultrasonic treatment device 1, in particular through sleeve-like components, for example, through a cylindrical sleeve 36, or is designed as an integral guiding channel of a sleeve-like component, for example of cylindrical sleeve 36. To receive a fluid, the fluid line 34 extends up to the coupling device or to coupling end 32, through which it can be connected to a fluid source.

From FIG. 5, it can furthermore be seen that the fluid line 34 is connected via a thread 35 or similar fastener to the oscillating axle 22 which is designed as a hollow axle. An interior bore 38 of oscillating axle 22 is fluidly connected with fluid line 34 or the fluid line is continued in the inner bore so that a fluid can be conveyed through the oscillating axle 22 up to the tool-holding device 21 and, from there, preferably through the tool 2, in the direction of the treatment site.

Figure 8:
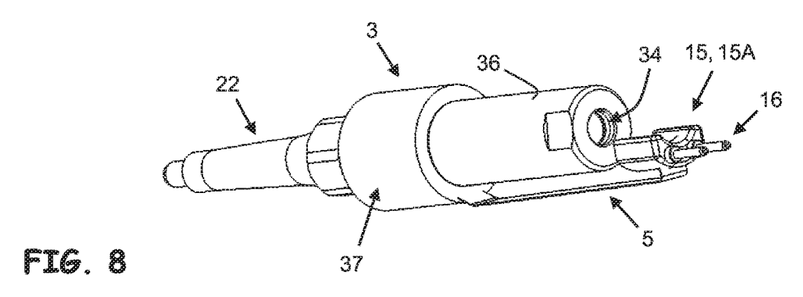
FIG. 8 shows an ultrasonic vibration assembly of an ultrasonic treatment device with an ultrasonic vibration generator including a circuit board, which are surrounded at least partly by a sheath, and an oscillating axle.

Stack 9, in particular the piezoelectric elements 4 and at least the partial area of circuit board 5 comprising contact sections 6, is/are surrounded by a sheath 37, which is, in particular, provided in order to protect stack 9 from contamination or damage, to insulate it electrically, and/or to fasten it within handpiece 20 (see also FIG. 8). Sheath 37 is preferably made of a plastic material, in particular by casting. Sheath 37 has, in particular, a substantially hollow cylindrical shape. The circuit board 5 extends through sheath 37 and/or extends along an outer surface of sheath 37, in particular, between sheath 37 and a fastening sleeve 39 of the handpiece 20.

The strip-like or elongated linking section 14 of circuit board 5 is, in particular, provided for the connection to an electrical power source and to transmit electrical energy from the power source to contact sections 6 and to the piezoelectric elements 4. To this end, the linking section 14 comprises, on its end facing the electrical power source, a plastic body 15, on which two electric contacts 16, electrically connected with the circuit board 5, in particular pin contacts, are provided to supply circuit board 5 with electric energy. The electric contacts 16 are connected to circuit board 5, in particular to its conducting paths, in an electrically conducting manner, for example, by soldering.

The plastic body 15 is formed as plug element 15A, which, for fastening and positioning of the, in particular flexible, circuit board 5 and the electrical contact 16, can be inserted into a plug connector 17 (see FIG. 7) of the medical, ultrasonic treatment device 1 or handpiece 20. The plug element 15A has a bent shape, for example a saddle shape, and has, in particular on one side, a concave bend and on an opposing side a corresponding convex bend. The plug connector 17 preferably has a form complementary to that of plug element 15A.

Figures 6, 7:
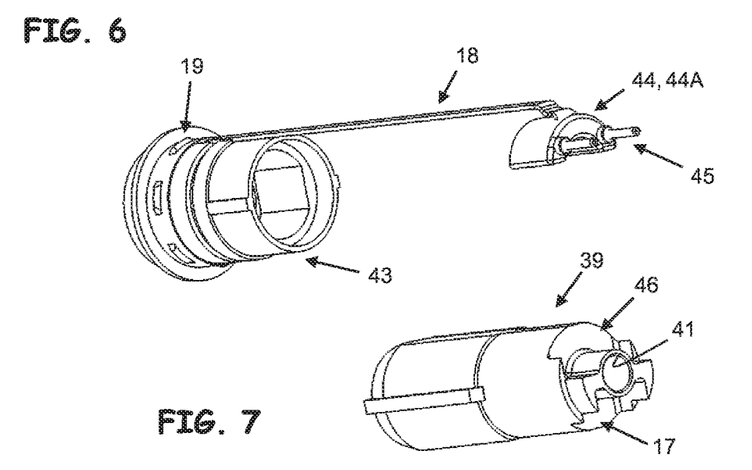
FIG. 6 shows a radiation source assembly of an ultrasonic treatment device with a radiation source emitting electromagnetic radiation and a plug element with electrical contacts for connection to an electrical power source.
FIG. 7 shows a fastening sleeve of an ultrasonic treatment device for fastening at least one plug element with electrical contacts for connection to an electrical power source.

The plug connector 17 is provided on a fastening sleeve 39 or formed as an integral part of the fastening sleeve 39. The plug connector 17 is, in particular, disposed on an end of fastening sleeve 39 facing the coupling end 32 of handpiece 20 and accessible from the coupling end 32 for the insertion of the plug element 15A.

The fastening sleeve 39 comprises a receptacle 40 for the at least partial holding of the cylindrical sleeve 36 and/or fluid line 34. The fastening sleeve 39 therefore surrounds cylindrical sleeve 36 and/or fluid line 34, as shown in FIG. 5. After pushing the fastening sleeve 39 onto the cylindrical sleeve 36, the plug element 15A can be pushed into the plug connector 17 in a simple manner, whereby the circuit board 5 and the electric contacts 16 are reliably fastened and positioned, as shown in FIG. 9.

The fastening sleeve 39 furthermore comprises, on an end facing the coupling end 32 of handpiece 20, an opening 41 connected to receptacle 40 for holding or passing through the fluid line 34.

Figure 9:
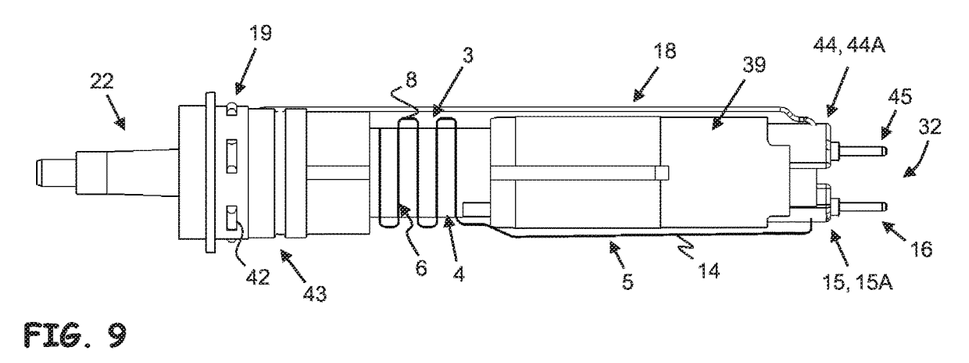
FIG. 9 shows an assembly unit of an ultrasonic treatment device with an ultrasonic vibration assembly of FIG. 4 or 8, and a radiation assembly of FIG. 6.

In FIG. 9, it can also be seen that, on handpiece 20, there is also another or second, in particular flexible, circuit board 18 for the supply of electrical energy to a radiation source 19 emitting electromagnetic radiation arranged on the ultrasonic treatment device 1 or on the handpiece 20. This second circuit board 18 is disposed at a distance from the (first) circuit board 5 and/or is designed as a separate circuit board from the (first) circuit board 5.

The radiation source 19 comprises one or more radiation-emitting elements, for example LEDs 42. The LEDs 42 are arranged on and/or around a carrier sleeve 43 and are provided to release electromagnetic radiation in the direction of the treatment site. The carrier sleeve 43 is formed as a hollow cylindrical sleeve in which the oscillating axle 22 can be held (see FIGS. 6 and 9).

From the radiation source 19 and/or the carrier sleeve 43, the second circuit board 18 extends in the direction of the coupling device or coupling end 32 of handpiece 20. The second circuit board 18 thereby, in particular, passes by the ultrasonic vibration generator 3 within the hollow grip sleeve 23 and/or extends parallel to sleeves 36, 39. The second circuit board 18 is shaped at least in one section to be strip-like and/or elongated.

The strip-like or elongated section of the second circuit board 18 is, in particular, provided for connection to an electric power source and to transmit electric energy from the power source to the radiation source 19. To this end, the second circuit board 18 comprises, on its end facing the electric power source, a plastic body 44, on which two electric contacts 45 electrically connected to the second circuit board 18, in particular pin contacts, are provided to supply circuit board 18 and the radiation source 19 with electric energy. The electric contacts 44 are electrically connected to the second circuit board 18, in particular to its conducting paths, for example, by soldering.

The plastic body 44 is formed as plug element 44A, which for fastening and positioning the, in particular flexible, second circuit board 18 and the electric contact 45, can be inserted into a plug connector 46 (see FIG. 7) of the medical ultrasonic treatment device 1 or handpiece 20. The plastic body 44 is, for example, made of silicone or epoxy resin and/or preferably electrically insulating. The plastic body 44 is preferably made by casting or molding. The plug element 44A has a bent shape, for example, a saddle shape and has, in particular on one side, a concave bend and, on an opposite side, a corresponding convex bend. The plug connector 46 preferably has a form complementary to that of plug element 44A.

The plug connector 46, like plug connector 17, is preferably provided on the fastening sleeve 39 or formed as an integral part of the fastening sleeve 39. The plug connector 46 is, in particular, arranged on an end of the fastening sleeve 39 facing the coupling end 32 of handpiece 20 and accessible from the coupling end 32 for inserting the plug element 44A. This permits both plug elements 15A, 44A to be attached to fastening sleeve 39 one after the other in a simple manner during the assembly of the handpiece 20, thereby reliably fastening and positioning the, in particular flexible, circuit boards 5, 18 and electric contacts 16, 45, as shown in FIG. 9.

The embodiments described or shown, in particular, serve to depict the invention. The characteristics, disclosed in an embodiment, are therefore not limited to that embodiment, but can rather be combined individually or together with one or more characteristics of one of the other embodiments.

What is claimed is:

1. A medical ultrasonic treatment device for generating ultrasonic vibrations and for transmitting the ultrasonic vibrations to a tool which can be connected to the ultrasonic treatment device, comprising:

an ultrasonic vibration generator with a plurality of piezoelectric elements to which an electric voltage can be applied in order to generate the ultrasonic vibrations, and a flexible circuit board to supply the plurality of piezoelectric elements with electric voltage, wherein the flexible circuit board is an elongated, strip-like element comprising contact sections and a linking section coupled as one-piece with the contact sections, wherein the contact sections are arranged at and between the piezoelectric elements for applying the electric voltage to the plurality of piezoelectric elements, and wherein the linking section extends from the contact sections beyond the plurality of piezoelectric elements in the direction of a coupling device of the medical ultrasonic treatment device for connection to an electrical power source.

2. The medical ultrasonic treatment device according to claim 1, wherein the flexible circuit board is formed into an S-shape such that the contact sections are arranged at and between the piezoelectric elements.

3. The medical ultrasonic treatment device according to claim 1, wherein on each contact section at least one surface contact is provided, at which an electrically conducting metal layer of the circuit board contacts one of the plurality of piezoelectric elements.

4. The medical ultrasonic treatment device according to claim 1, wherein at least one contact section comprises two opposite sides, wherein each of the opposite sides has a surface contact.

5. The medical ultrasonic treatment device according to claim 1, wherein the contact sections are arranged parallel and/or substantially aligned to one another.

6. The medical ultrasonic treatment device according to claim 1, wherein neighboring contact sections are connected to one another by respective connecting sections of the circuit board.

7. The medical treatment device according to claim 1, wherein the plurality of piezoelectric elements are arranged in a stack, wherein one respective contact section of the circuit board is arranged between two neighboring piezoelectric elements of the stack.

8. The medical ultrasonic treatment device according to claim 6, wherein the plurality of piezoelectric elements are arranged in a stack, wherein the connecting sections are arranged outside the stack.

9. The medical ultrasonic treatment device according to claim 8, wherein the connecting sections following one another relative to a longitudinal axis of the stack are each arranged on opposite sides of the stack.

10. The medical ultrasonic treatment device according to claim 7, wherein the stack comprises a passage which is formed of openings in the plurality of piezoelectric elements and of openings in the contact sections of circuit board.

11. The medical ultrasonic treatment device according to claim 1, wherein the linking section comprises two opposite sides, wherein each side has at least one conducting path for connection to an electrical power source.

12. The medical ultrasonic treatment device according to claim 1, wherein the linking section comprises on an end a plastic body on which two electrical contacts are provided which electrically connect to the circuit board for supplying the circuit board with electric energy.

13. The medical ultrasonic treatment device according to claim 12, wherein the plastic body is formed as a plug element which can be inserted into a plug connector of the medical ultrasonic treatment device to fasten the circuit board and the electrical contacts.

14. The medical treatment device according to any claim 1, wherein the contact sections are arranged at an angle relative to the linking section.

15. The medical ultrasonic treatment device according to claim 1, comprising a radiation source for emission of electromagnetic radiation, wherein the circuit board for supplying the plurality of piezoelectric elements with electric voltage or a separate circuit board is provided for supply of the radiation source with electric energy.

16. A method for manufacturing a medical ultrasonic treatment device for generating ultrasonic vibrations and for transmitting the ultrasonic vibrations to a tool which is or can be connected to the ultrasonic treatment device, comprising:

providing an ultrasonic vibration generator with a plurality of piezoelectric elements to which an electrical voltage can be applied in order to generate the ultrasonic vibrations, and connecting the plurality of piezoelectric elements to a flexible circuit board through which the piezoelectric elements can be supplied with electric voltage, wherein the flexible circuit board is an elongated, strip-like element comprising contact sections and a linking section coupled as one-piece with the contact sections wherein the contact sections are arranged at and between the piezoelectric elements for applying the electric voltage to the plurality of piezoelectric elements, and wherein the linking section extends from the contact sections beyond the plurality of piezoelectric elements in the direction of a coupling device of the medical ultrasonic treatment device to connect to a control, regulating, and/or supply device.

17. The method according to claim 16, wherein on each contact section at least one surface contact with an electrically conducting metallic layer is provided, and wherein between two neighboring contact sections one piezoelectric element of the plurality of piezoelectric elements is inserted, such that the piezoelectric element inserted between the two neighboring contact sections contacts one surface contact of each of the two neighboring contact sections.

18. The method according to claim 16, wherein connecting the plurality of piezoelectric elements to a flexible circuit board comprises bending the flexible circuit board in the area of the contact sections such that the contact sections are arranged at and between the piezoelectric elements.

19. The method according to claim 18, wherein the flexible circuit hoard is bent in the area of the contact sections into an S-shape such that the contact sections are arranged at and between the piezoelectric elements.

* * * * *

UNITED STATES PATENT AND TRADEMARK OFFICE
CERTIFICATE OF CORRECTION

| | |
|---|---|
| PATENT NO. | : 11,490,991 B2 |
| APPLICATION NO. | : 15/922362 |
| DATED | : November 8, 2022 |
| INVENTOR(S) | : Auer et al. |

It is certified that error appears in the above-identified patent and that said Letters Patent is hereby corrected as shown below:

In the Claims

Column 16, Line 58, "circuit hoard" should read --circuit board--.

Signed and Sealed this
Twentieth Day of December, 2022

*Katherine Kelly Vidal*

Katherine Kelly Vidal
*Director of the United States Patent and Trademark Office*